United States Patent [19]

Jones et al.

[11] Patent Number: 5,192,809
[45] Date of Patent: Mar. 9, 1993

[54] PROCESS FOR RECLAIMING A THERMOSET POLYMER

[75] Inventors: C. Andrew Jones, Newtown Square; Anne M. Gaffney, West Chester; David W. Leyshon, West Chester; Glenn E. Cozzone, West Chester; John A. Sofranko, West Chester, all of Pa.

[73] Assignee: ARCO Chemical Technology, L.P., Wilmington, Del.

[21] Appl. No.: 860,638

[22] Filed: Mar. 30, 1992

[51] Int. Cl.$^5$ ............................................ C08L 101/00
[52] U.S. Cl. ........................................ 521/40; 521/48; 521/49
[58] Field of Search ............................ 521/40, 48, 49

[56] References Cited

U.S. PATENT DOCUMENTS

| | | |
|---|---|---|
| 4,108,730 | 8/1978 | Chen et al. . |
| 4,175,211 | 11/1979 | Chen et al. ........................ 585/241 |
| 4,584,421 | 4/1986 | Saito et al. ........................ 585/241 |
| 4,851,601 | 7/1989 | Fukuda et al. ..................... 585/241 |
| 5,079,385 | 1/1992 | Wu ....................................... 585/241 |
| 5,136,117 | 8/1992 | Paisley et al. ..................... 585/241 |

OTHER PUBLICATIONS

Mordi et al., *J. Chem. Soc. Chem. Commun.* 374(1992).

Primary Examiner—Maurice J. Welsh
Attorney, Agent, or Firm—Stephen D, Harper

[57] ABSTRACT

Thermoset polymers such as polyurethanes and unsaturated polyester resins may be conveniently converted into useful volatile lower molecular weight organic compounds. Fillers can be recovered from filled thermoset resins using the process of the invention, which employs a zeolite-containing particulate catalyst.

33 Claims, 1 Drawing Sheet

PROCESS FOR RECLAIMING A THERMOSET POLYMER

FIELD OF THE INVENTION:

This invention relates to methods whereby thermoset polymers such as those recoverable as waste components may be converted into volatile lower molecular weight compounds useful as chemical intermediates, solvents, or fuels. The invention also pertains to methods whereby fillers such as glass fibers or inorganic powders are recovered in reuseable form from filled thermoset polymers.

BACKGROUND OF THE INVENTION:

In view of the increasing importance of polymers as substitutes for conventional materials of construction such as glass, metal, paper, and wood, the perceived need to conserve non-renewable resources such as petroleum and the dwindling amount of landfill capacity available for the disposal of waste products, considerable attention has been devoted in recent years to the problem of recovering, reclaiming, recycling or in some way reusing waste polymers. The disposal of thermoset polymers or resins is particularly challenging, since such polymers are highly cross-linked and hence do not melt or dissolve. In contrast, thermoplastic polymers such as polystyrene, polyethylene, polypropylene, polyamide, polybutylene terephthalate, polyethylene terephthalate, and the like may be readily liquefied by heating and the melted resin easily reshaped into useful articles such as films, fibers, injection or thermoform molded parts, and foamed sheets or containers.

It has also been proposed to pyrolyze or catalytically crack thermoplastic polymers so as to convert the high molecular weight polymer into volatile compounds having much lower molecular weight. The volatile compounds, depending on the process employed, may be either relatively high boiling liquid hydrocarbons useful as fuel oils or fuel oil supplements or light to medium boiling hydrocarbons useful as gasoline-type fuels or as chemical "building blocks." For example, polystyrene may be pyrolytically cracked s as to provide a substantial yield of styrene monomer.

However, the pyrolytic or catalytic cracking methods developed to date for use with thermoplastic polymers are not appropriate for use with thermoset polymers. For instance, U.S. Pat. No. 4,175,211 (Chen et al.) describes a process for converting relatively ash-free thermoplastic polymer wastes to liquid, solid, and gaseous products. The waste is mixed at a high temperature with a high-boiling refractory petroleum stream so as to preferably dissolve or melt the waste and the mixture then catalytically cracked. Thermosetting resins, according to the patent, cannot be successfully treated using such a process owing to the high resistance of these materials towards decomposition. The insolubility and infusibility of thermosetting resins in such petroleum streams will also interfere with the desired cracking process.

Yet another obstacle to the pyrolysis or cracking of a thermoset resin is the fact that such resins typically contain high proportions of various fillers such as glass fibers or inorganic powders (e.g., calcium carbonate, talc) to provide stiffness, strength, or reinforcement to the thermoset resin. Any method for reclaiming a thermoset resin must therefore provide an acceptable means of handling large quantities of insoluble, infusible and thermally stable filler. It would be highly desirable to recover the filler component from a waste thermoset polymer in a form such that it may be readily used again to reinforce a polymeric resin, since disposal of this component in a land fill or the like would not be environmentally or economically acceptable.

SUMMARY OF THE INVENTION

This invention provides a process for reclaiming a filled thermoset polymer comprising the steps of:

(a) Heating particles of the polymer and a zeolite-containing particulate catalyst in a fluidized bed reaction zone at a temperature effective to produce a coarse filler component, coke, a volatile organic component, and a spent catalyst component;

(b) Withdrawing a first stream comprising the volatile organic component from the reaction zone;

(c) Withdrawing a second stream comprising spent catalyst, coke, and the coarse filler component from the reaction zone;

(d) Heating the second stream in a regeneration zone in the presence of oxygen at a temperature effective to convert the coke to carbon dioxide and water and to regenerate the catalyst; and (e) Separating the regenerated catalyst and coarse filler component.

In one embodiment, the present invention provides a process for reclaiming a filled thermoset polymer derived from an isocyanate-containing reactant comprising the steps of:

(a) Contacting particles of the polymer and a zeolite-containing particulate catalyst in a dense fluidized bed reaction zone at a temperature of from about 450° C. to 750° C. to produce a coarse filler component, coke, a volatile organic component comprised of at least one organic amine, and a spent catalyst component;

(b) Withdrawing a first stream comprising the volatile organic component from the reaction zone;

(c) Withdrawing a second stream comprising spent catalyst, coke, and the coarse filler component from the reaction zone;

(d) Heating the second stream in a regeneration zone in the presence of oxygen at a temperature of from about 450° C. to 850° C. so as to convert the coke to carbon dioxide and to regenerate the catalyst;

(e) Separating the regenerated catalyst and coarse filler component and (f) Introducing the regenerated catalyst to the reaction zone.

Additionally, the invention provides a process for converting a thermoset polymer derived from an isocyanate-containing reactant to a volatile organic component comprised of at least one organic amine, said process comprising contacting particles of the thermoset polymer and a zeolite-containing particulate catalyst at a temperature of from about 450° C. to 750° C.

DETAILED DESCRIPTION OF THE INVENTION

Figure 1:
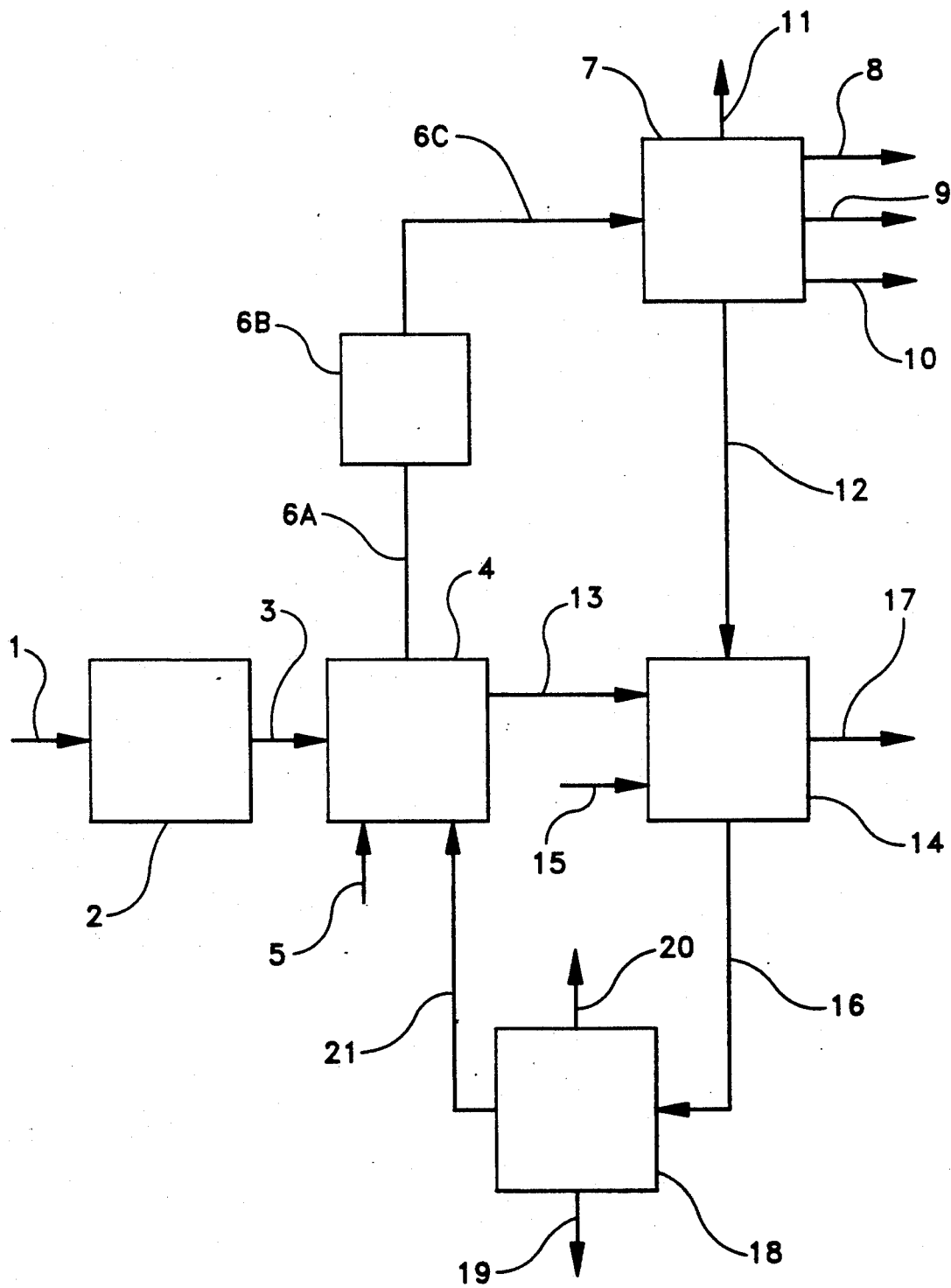
FIG. 1 is a schematic flow diagram of a preferred embodiment of the process of the invention.

Any thermoset polymer may be employed in the process of this invention, including not only polymers which are already crosslinked but also thermosettable or partially thermoset materials which would ordinarily be subject to crosslinking upon heating. A thermoset polymer in this context thus means a polymer which cannot be remelted or remolded without destroying its original characteristics, or a polymer subject to crosslinking reactions at temperatures necessary to induce flow. Examples of suitable thermoset resins include, but are not limited to, epoxy resins, melamine resins, phenolic resins (e.g., phenol-formaldehyde resins), urea resins, amino resins, unsaturated polyester resins, melamine-formaldehyde resins, allylic resins, thermoset polyimides, as well as mixtures thereof.

Thermoset polymers derived from an isocyanate-containing reactant are particularly advantageous for use, as the process of this invention enables the preparation of monomeric or oligomeric organic amines from such polymers in relatively high yield. Amines have high value as chemical intermediates and may be used to prepare isocyanates, amides, amine salts, azo compounds, ureas, carbamates, and other useful types of compounds. This result was unexpected, since the catalytic cracking of polymeric materials has heretofore given predominantly hydrocarbons (i.e., compound containing only carbon and hydrogen) and since difficulties with catalyst deactivation or undesired side reactions are commonly encountered when heteroatom-containing substrates are employed. Illustrative thermoset polymers derived from isocyanate-containing reactants include, for example, polyurethanes (polymers obtained by reacting di- or polyisocyanates with hydroxy-containing reactants such as polyether polyols, polyester polyols, glycols, and the like), polyureas (polymers obtained by reacting di- or polyisocyanates with amine-containing reactants such as amine-tipped polyether polyols, amine chain extenders or curatives, and the like), polyisocyanurates (polymers obtained by trimerization of an isocyanate), as well as hybrid or mixed type thermoset resins such as polyurethane-modified polyisocyanurates (polymers obtained by reacting a portion of the isocyanate groups of a di-or polyisocyanate with an hydroxy-containing reactant and trimerizing another portion of the isocyanate groups). Polymers of the latter type are well-known and are described, for example, in U.S. Pat. Nos. 4,965,038, 4,731,427, and 5,059,670. The thermoset polymers derived from isocyanate-containing reactants may be in various forms such as flexible foams, rigid foams, microcellular elastomers, coatings, adhesives, sealants, and solid elastomers.

A distinct advantage of the process of this invention is that mixtures of various thermoset polymers may be utilized as the feed. Another advantage of the invention is that thermoplastic polymers such as polyethylene, polypropylene, polystyrene, polyamide (nylon), polyvinyl chloride, polyethylene terephthalate, polybutylene terephthalate, polymethyl methacrylate, polyphenylene oxide, styrene/maleic anhydride copolymer, ABS and MBS resins, thermoplastic polyurethanes, and the like and elastomers and rubbers such as natural rubbers, polybutadiene, polyolefin rubbers, butyl rubbers, neoprenes, polyisobutylene, silicoane rubbers, nitrile rubbers, styrene-butadiene or styrene-isoprene rubbers, and acrylate rubbers may also be employed as admixtures with the thermoset polymer, since such thermoplastics and rubbers will be successfully cracked or converted to useful volatile organic compounds simultaneous with transformation of the thermoset polymer. Moreover, cellulose-based organic wastes such as paper or wood will not adversely affect the process of this invention. Thus, the need for tedious and expensive separation steps prior to introduction of the feed into the reaction zone is minimized.

Another advantage of the process of this invention is the ability to handle feed streams containing highly filled thermoset polymers, since the filler or reinforcement in said feed stream is effectively separated from the volatile organic products derived from the polymer and recovered in a form whereby it may be subsequently reused as a filler to improve the physical and mechanical properties of virgin polymers. Surprisingly, the presence of the filler in the process does not adversely affect the yields of volatile organic compounds obtainable in the process or affect the activity of the zeolite-containing catalyst. Typically, a filled thermoset polymer will contain up to 50 to 75% by weight of one or more fillers. The fillers may be any of the conventional additives incorporated into thermoset resin, including, for example, glass fibers (strands, filament yarns, staple fibers, staple yarns, woven or unwoven mats, long or short fibers), glass flakes, glass spheres, asbestos, calcium carbonates, dolomite, silicates, talc, kaolin, mica, feldspar, silicas, wollastonite, barium sulfate, alumina, and other mineral or inorganic fillers and reinforcements. Thermoset polymers containing carbon-based fillers and reinforcements such as carbon black, carbon fibers, graphite, synthetic reinforcing fibers such as aromatic amide polymers (e.g., "Kevlar", a product of E. I. du Pont de Nemours) can also be readily processed and reclaimed by the process of this invention.

The process of this invention is especially useful for processing the "fluff" obtainable from scrapped automobiles. "Fluff" is the mostly nonmetallic material recovered from cars and trucks and includes glass, fibers, foams (especially polyurethane foams), and various plastics and other resins.

Before introduction of the thermoset polymer into the reaction zone, the waste polymer may be converted into fine particulate form. A variety of size reduction means are well known in the art and any of these means may be employed in the process of this invention. For example, the thermoset polymer, which may initially take the form of large articles such as automotive body panels, tires, gaskets, bushings, shower stalls, boat hulls, furniture or automotive seat cushions, or foamed insulation from appliances or building construction or demolition, can be first subjected to a coarse shredding, chopping, or crushing operation. The coarsely shredded or chopped thermoset polymer can subsequently be ground, pulverized, or further crushed to yield the fine particles required.

Additional pretreatment steps can be incorporated, if desired, such as flotation, washing, drying, metals separation, or the like. In any case, it is important that the thermoset polymer be in a form of relatively small particles when contacted with the zeolite-containing catalyst in the reaction zone in order to achieve optimum results from the process of this invention. Small particles are desirable in order to maximize the surface area/volume ratio of the particles, thus increasing the rate at which the polymer particles will be converted in the reaction zone, and also to ensure that the polymer particles do not rapidly "settle out" in the fluidized reaction zone from the zeolite-containing catalyst (which optimally also is relatively small in size). The average diameter of the thermoset polymer particles should therefore be less than about 1 cm, but more preferably is less than about 1 mm, and most preferably is less than about 0.5 mm.

The thermoset polymer particles may be admixed with or suspended in a hydrocarbon-based carrier (preferably liquid in form) such as crude oil, recycled lubricating oils, waste cooking oils, melted thermoplastic polymers, and the like prior to introduction into the reaction zone. The hydrocarbon-based carrier will be catalytically cracked into useful volatile organic compounds.

The zeolite-containing particulate catalyst component of this invention may be either an unbound (unsupported) zeolite or a catalyst wherein a binder (co-gel) or support is used in combination with a zeolite. Such zeolite binders or supports are well known in the art, as are methods of preparing bound or supported zeolite catalysts Illustrative binders include silica, alumina, silica-alumina, silica-titania, silica-thoria, silica-magnesia, silica-zironia, silica-beryllia, and ternary compositions of silica with other refractory oxides. Also useful as binders or matrix materials are clays such as montmorillonites, kaolins, bentonites, halloysites, dickites, nacrites, and ananxites. The proportion of zeolite:binder may range from 99:1 to 1:99, but preferably is from 5:95 to 80:20.

In this context, the term "zeolite" encompasses not only the true zeolites, which are characterized by having crystalline aluminosilicate three-dimensional structures arising from a framework of $[SiO_4]^{4-}$ and $[AlO_4]^{5-}$ coordination polyhedra linked through their corners, but also the "zeotypes", which are crystalline silicates which resemble true zeolites in structure and properties but which are essentially alumina-free. Zeotypes are exemplified by crystalline silica polymorphs (e.g., silicates, disclosed in U.S. Pat. No. 4,061,724 and organosilicates, disclosed in U.S. Pat. No. Re. 29,948), chromia silicates (e.g., CZM), ferrosilicates and galliosilicates (disclosed in U.S. Pat. No. 4,238,318), and borosilicates (disclosed U.S. Pat. Nos. 4,226,420, 4,269,813, and 4,327,236). The use of crystalline aluminosilicate zeolite is preferred, however. Such zeolites are well known and are described in Szostak, *Molecular Sieves: Principles of Synthesis and Identification* Van Nostrand Reinhold (1989), Dyer, *An Introduction to Zeolite Molecular Sieves* Wiley (1988), Jacobs, *Carboniogenic Activity of Zeolite* Elseviar (1977), Breck, *Zeolite Molecular Sieves:Structure, Chemistry, and Use* Wiley (1974), and Breck et al. "Molecular Sieves", in *Kirk-Othmer Encyclopedia of Chemical Technology* Vol. 15, p. 638. Zeolites of both natural and synthetic orgin may be employed. Preferred zeolites for use in this invention include ZSM-5 (see U.S. Pat. Nos. 3,702,886 and 3,770,614), ZSM-11 (see U.S. Pat. No. 3,709,979), ZSM-12 (see U.S. Pat. No. 3,832,449), ZSM-21 and ZSM-38 (see U.S. Pat. No. 3,948,758), ZSM-23 (see U.S. Pat. No. 4,076,842), and ZSM-35 (see U.S. Pat. No. 4,016,246). Zeolites containing group VA elements, especially phosphorus-containing zeolites, are particularly preferred for use since it has been unexpectedly found that this class of zeolites is very tolerant of steam and tends to retain an unusually high degree of activity and selectivity in the presence of steam. This is an important advantage since steam is a preferred carrier gas for use in the process of this invention. Zeolite catalysts containing Group VA elements are described in U.S. Pat. Nos. 3,977,832, 3,925,208, and 4,379,761, for example and in Vedrine, *J. Catal.* 73, 147 (1982). Boron-containing zeolites or borosilicates (as described in U.S. Pat. Nos. 3,328,119, 4,029,716, 4,078,009, 4,269,813 and 4,656,016 and European Pat Pub. Nos. 77,946 and 73,482) are also especially preferred for use in view of the finding that such catalysts similarly show extremely good steam tolerance. The teachings of each of the foregoing patents are incorporated herein by reference in their entirety. Illustrative boron-containing zeolite catalysts suitable for use include "AMS-1B", a borosilicate having a ZSM-5 structure available from Amoco.

Also suitable for use will be zeolite catalysts loaded or doped with Group VIII metals such as platinum and palladium to help carry out secondary functions such as hydrogenation or hydrogenolysis in addition to the basic cracking reaction. Such bifunctional zeolite catalysts are well known and are described, for example, in Chapter V of Jacobs, *Carboniogenic Activity of Zeolites*, Elsever (1977).

It will also be desirable to utilize the acidic forms of zeolites such as the ZSM types and borosilicates. HZSM-5 is particularly useful.

Other representative zeolite catalysts suitable for use include zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,314,752), mordenite, chabazite, faujasite, erionite, offretite, and zeolite beta. The teachings of each of the foregoing patents are incorporated herein by reference in their entirety. Mixtures of zeolite catalysts may also be employed. The pore size of the zeolite may be varied to control the composition of the volatile organic component produced by cracking the thermoset polymer. Thus, the pore size may be either small (a pore/channel diameter $<5$ angstroms; generally, those zeolites having 8 tetrahedra constituting their pore defining ring), intermediate (a pore/channel diameter between 5–7 angstroms; generally, those zeolites having 10 tetrahedra or 12 puckered tetrahedra constituting their pore defining ring), or large (a pore/channel diameter $>7$ angstroms; generally, those zeolites having more than 12 tetrahedra in their pore defining ring). In general, the use of large pore size zeolites will favor the production of higher molecular weight, higher boiling volatile organic compounds from the thermoset resin.

The particle size of the zeolite-containing particulate catalyst should be selected such that the catalyst may be readily fluidized in the reaction zone. In general, the catalyst should have a particle size of from about 10 to 150 microns. To facilitate the separation of the catalyst from the filler component of a filled thermoset polymer, it will be advantageous to select a zeolite catalyst which is relatively uniform in particle size (i.e., one that does not have a high proportion of particles that are substantially different in size from the average particle size).

The accompanying drawing illustrates preferred embodiment of the process of the invention. Other embodiments will, however, be evident to those skilled in the art.

Waste thermoset polymer, which may be optionally admixed in any suitable ratio with other waste materials, is fed through line 1 to size reduction zone 2 wherein the thermoset polymer is converted to the desired particle size. As described hereinabove, this size reduction may be accomplished using conventional means such as a shredder, chopper, or grinding apparatus, which may be employed in a sequential, parallel, or tandem manner. The particulate thermoset polymer exiting the size reduction zone may be subsequently subjected to separation processes whereby non-polymeric materials such as metals, glass, wood, paper, cloth and the like are removed using means such as a magnetic separation device or classification device separating according to density such as a shaking table or flotation tank. The waste thermoset polymer-containing stream may also, of course, be subjected to similar separation processes to remove such undesired contaminants prior to entering size reduction zone 2. The particles of thermoset polymer may additionally be washed with water or organic solvent and dried before being introduced through line 3 to fluidized bed reaction zone 4.

The thermoset polymer particles are heated with the zeolite-containing particulate catalyst in fluidized bed reaction zone 4 at a temperature effective to convert all or part of the polymeric portion of the particles into a volatile organic component. In general, this temperature will be from about 450° C. to 750° C., but preferably will be from about 500° C. to 700° C. The successful operation of the process of this invention was surprising and unexpected in view of the teaching of the prior art that it is necessary to liquefy a polymer by either melting it or dissolving it to render it susceptible to catalytic cracking. The liquefication was thought to be crucial to ensure intimate contact between a zeolite catalyst and the polymer. The precise mechanism by which the transformation associated with the process of this invention takes place is not known, but it is postulated that the thermoset polymer undergoes a limited amount of preliminary pyrolysis or thermal cracking upon being exposed to the high temperature within the reaction zone whereby partial scission or breakdown of the polymer takes place. The thermal degradation products thereby produced are thought to be sufficiently mobile or volatile so as to be capable of intimate contact with the zeolite-containing particulate catalyst, thereafter being cracked by action of the catalyst into even more volatile monomers and other low molecular weight organic species.

The reactor velocity is sufficient to maintain the catalyst and the thermoset polymer particles present in random motion. The velocity should be high enough to effectively carry over through line 6A a first stream comprising the volatile organic component generated in the process of this invention. A carrier gas may be introduced into the reaction zone in order to maintain the desired reactor velocity. The carrier gas, which may be introduced through line 5, for example, can be an inert gas such as nitrogen or helium, one or more light hydrocarbons such as methane, ethane, butanes or the like, steam (a preferred carrier gas) or some combination or mixture thereof.

The catalyst is deployed in a fluidized bed, preferably a dense or "fluffed" fluidized bed so as to minimize the distance between the thermoset polymer particles and the catalyst particles and to prevent the unconverted polymer particles from settling too rapidly to the bottom of the reaction zone, while at the same time promoting effective, rapid, and intimate mixing of the components present in the reaction zone. Methods and equipment for using a zeolite-type catalyst in a fluid bed reactor are well known and are described, for example, in Venuto et al., *Fluid Catalytic Cracking With Zeolite Catalysts*, Marcel Dekker (1979), Sterka, "Fluid Catalytic Cracking", in *Chemical and Process Technology Encyclopedia*, Considine, Ed., McGraw-Hill (1974) pp. 505–509, and Anonymous, "Fluidized Bed Operations", Ibid., pp. 509–511, incorporated herein by reference in their entirety. The average concentration of catalyst particles within the fluidized bed is preferably about 5 to 15 pounds per cubic foot. Since at least a portion of the thermoset polymer particles are likely to be larger or heavier than the catalyst particles, it is desirable to introduce the thermoset polymer particles into the reactor zone at a point near the top of the fluidized catalyst bed.

If desired, a catalyst separation zone 6B may be positioned such that products exiting the reaction zone 4 through line 6A are treated so as to remove any catalyst that may have been inadvertently carried over and to return this catalyst to the reaction zone. Catalyst separation zone 6B is suitably comprised of one or more cyclone vessels of the type commonly employed in fluid catalytic cracking processes. In addition to separating or disengaging the particulate catalyst from the exiting product stream, it is also desirable to operate the catalyst separation zone 6B so as to separate and return to the reaction zone 4 other particulate materials such as filler or thermoset polymer particles which may be present.

Treatment of filled thermoset polymer in accordance with this invention will generate not only a volatile organic component but also coke (a non-volatile carbonaceous residue having a high ratio of carbon to hydrogen), filler, and spent catalyst.

The filler may vary from very fine to very coarse in size, depending upon the type of filler present initially in the thermoset polymer and the degree of size attrition or reduction experienced during processing. The fine filler component may typically exit from the catalyst separation zone 6B together with the volatile organic component while the coars filler component will tend to remain with the catalyst in the fluidized bed. Catalyst separation zone 6B may be configured and operated so as to achieve the desired separation of the filler component exiting reaction zone 4.

The coke will typically be deposited on the surfaces of the spent catalyst and the filler. The spent catalyst will be lower in activity than the fresh catalyst. To regenerate the spent catalyst and to remove the coke from the spent catalyst and the filler so that the catalyst and filler may be desirably reused or recycled, a second stream comprising the spent catalyst, coarse filler component and coke is withdrawn from the reaction zone 4 through line 13 and passed into regeneration zone 14, wherein the stream is heated in the presence of oxygen (supplied through line 15) at a temperature effective to convert the coke to carbon dioxide and water and to regenerate the catalyst. Preferably, the temperature in the regeneration zone is from about 450° to 900° C. (more preferably, from about 600° to 750° C.). An advantage of this process is that the heat generated in the catalyst regeneration step can be used in other steps of the process requiring the input of heat such as the fluidized bed reaction zone. The overall process is thus remarkably energy efficient. Gaseous products are removed through line 17, while the particulate product (regenerated catalyst and filler, both of which are essentially free of coke) is withdrawn via line 16. The particulate product is subsequently treated in separation zone 18 so as to fractionate the particulate product on the basis of size, weight, or density, thus separating the regenerated catalyst from a fine reclaimed filler component and a coarse reclaimed filler component. The separation zone 18 may suitably comprise one or more cyclone vessels, sieves, filters, or the like. The separation means are chosen such that the particles present are separated on the basis of both weight and size. The fine reclaimed filler component will comprise that portion of the filler component (withdrawn through line 20) which is smaller in size and/or lighter in weight than the regenerated catalyst (which typically will have an average particle size of from about 50 to 150 microns). The coarse reclaimed filler component (withdrawn through line 19) will comprise the portion of the filler component which is larger in size and/or heavier than the regenerated catalyst. A key advantage of the process of this invention is that the filler which is recovered is essentially free of any residual coke and will be in a form suitable for immediate reuse as a filler in a filled thermoset or thermoplastic resin.

The regenerated catalyst is fed back into reaction zone 4 through line 21 so as to replenish the supply of active catalyst in the reaction zone. The catalyst regeneration process is preferably carried out in a continuous manner. The regenerated catalyst will contain a minor amount of filler comprising particles comparable in size and weight to the catalyst particles. These filler particles will not tend to accumulate, however, due to their proclivity to gradually attrit during the physical handling steps of the process, which eventually will reduce the size of said particles to an extent as to permit facile separation from the catalyst particles. For this reason, the zeolite-containing catalyst particles should be selected such that they have an exceptionally high degree of resistance towards attrition.

The volatile organic hydrocarbon component disengaged from catalyst separation zone 6B passes through line 6C to the product fractionator 7 and is separated into the desired hydrocarbon product streams. The nature of these hydrocarbon product streams will vary depending upon the composition of the thermoset polymer, the type of catalyst, and the operating conditions within the reactor zone, among other factors. If the thermoset polymer is predominantly hydrocarbon-based (i.e., contains carbon and hydrogen), for example, the hydrocarbon product streams may comprise a gasoline-grade fraction withdrawn via line 8, a light cycle oil fraction withdrawn via line 9, a heavy cycle oil withdrawn via line 10, a bottoms fraction withdrawn via line 12, and gaseous fraction withdrawn via line 11. The bottoms fraction, which will be comprised of tarry substances of relatively high molecular weight as well as fine filler, incompletely converted thermoset polymer particles or catalyst particles which are not recaptured and returned to the reactor zone by catalyst separation means 6B, is advantageously introduced through line 12 to regeneration zone 14. The gaseous fraction (comprising light hydrocarbons such as methane, ethane, and propane) may be either employed as a carrier gas and introduced back into the reaction zone via line 5 or burned as a fuel to provide the heat necessary to maintain reaction zone 4 at the desired temperature.

If the volatile organic component which is generated in the process of this invention contains compounds having high value as monomers or chemical intermediates (e.g., ethylene, propylene, butene, styrene, amines), these compounds may be recovered by conventional separation and fractionation means. For example, if the thermoset polymer is derived from styrene (e.g., polystyrene, unsaturated polyester resin), the volatile organic component will generally contain relatively large amounts of styrene which may be separated from the other organic compounds present and reused to prepare new styrenic resins. Similarly, if the thermoset polymer is derived from an isocyanate reactant (e.g., polyurethane), organic amines such as anilines, pyridines, quinolines, indoles, and the like may be obtained and isolated from the volatile organic component using conventional separation techniques.

The present invention will be further described by the following specific examples, which are given by way of illustration and not as limitations on the scope of the invention.

EXAMPLE 1

To demonstrate that a thermoset polymer derived from an isocyanate reactant may be converted to a volatile organic component comprised of useful organic amines, a 0.4 g sample of "Arset" resin (a polyurethane-modified polyisocyanurate resin available from ARCO Chemical Company) was heated from 21° C. to 681° C. in the presence of 0.5 g Conteka CBV 3020 HZSM-5 catalyst (−60+100 mesh) in a fixed bed configuration. The vapor residence time was 0.2 seconds. Table I shows the various products obtained, which were identified by GC/MS analysis. The mass balance was 99%, oxygen balance was 103%, and the nitrogen balance was 82%.

TABLE I

| Product | Normalized Yield (Wt. %) |
| --- | --- |
| Methane | 1.4 |
| Ethylene | 0.4 |
| Ethane | 0.4 |
| Propylene | 4.3 |
| Propane | 0.4 |
| $C_4$'s | 0.8 |
| $C_5$'s | 0.4 |
| Carbon Dioxide | 16.8 |
| Carbon Monoxide | 1.2 |
| Benzene | 1.2 |
| Toluene | 2.9 |
| Xylenes + Ethylbenzene + Styrene | 2.6 |
| Pyridine | 0.5 |
| Methylpyridines | 1.0 |
| Phenol | 0.3 |
| Aniline | 13.1 |
| Methylanilines | 7.6 |
| Quinoline | 2.4 |
| Methylquinolines | 5.3 |
| Dimethyl- and Ethylquinolines | 1.7 |
| Trimethyl- and Methylethylquinalines | 2.8 |
| Diethylquinolines | 1.4 |
| Indole | 0.9 |
| Methylindoles | 1.4 |
| Dimethyl- and Ethylindoles | 1.4 |
| Other Liquids | 4.3 |
| Water | 6.6 |
| Coke on Catalyst | 4.2 |
| Residual Char | 12.6 |

EXAMPLE 2

To illustrate the conversion of a filled thermoset polymer using the process of this invention, Example 1 was repeated using 0.4 g of a glass-fiber filled "Arset" resin (containing 48% by weight glass). The mass balance observed was 106%, oxygen balance was 104%, and the nitrogen balance was 75%. The products obtained are shown in Table II.

TABLE II

| Product | Normalized Yield (Wt. %) |
| --- | --- |
| Methane | 1.5 |
| Ethylene | 1.5 |
| Ethane | 0.5 |
| Propylene | 5.5 |
| Propane | 0.4 |
| $C_4$'s | 2.1 |

TABLE II-continued

| Product | Normalized Yield (Wt. %) |
|---|---|
| $C_5$'s | 0.8 |
| Carbon Dioxide | 24.0 |
| Carbon Monoxide | 1.3 |
| Benzene | 2.0 |
| Toluene | 2.1 |
| Xylenes + Ethylbenzene + Styrene | 2.3 |
| Pyridine | 0.2 |
| Phenol | 1.5 |
| Aniline | 16.5 |
| Methylanilines | 3.2 |
| Quinoline | 2.3 |
| Methylquinolines | 3.4 |
| Dimethyl- and Ethylquinolines | 1.4 |
| Trimethyl- and Methylethylquinolines | 0.7 |
| Indole | 0.6 |
| Methylindoles | 1.1 |
| Dimethyl- and Ethylindoles | 1.4 |
| Other Liquids | 1.2 |
| Water | 4.1 |
| Coke on Catalyst | 6.6 |
| Residual Char | 12.7 |

EXAMPLE 3

This example demonstrates the cracking of a glass-fiber filled sheet molding compound (e.g., unsaturated polyester thermoset resin) using the process of this invention. The thermoset resin contained 75% filler. The catalyst employed was 0.4 g Grace Additive O, a spray-dried ZSM-5 zeolite catalyst containing kaolin binder (−100 +200 mesh; 15% ZSM-5). The thermoset polymer was contacted with the zeolite at 600° C. in a fluidized bed reactor using nitrogen as a carrier gas. The resin was mostly consumed in 2 minutes, but product collection was continued for 10 minutes. Table III shows the products obtained.

TABLE III

| Product | Normalized Yield (Wt. %) |
|---|---|
| Carbon Dioxide | 10.9 |
| Water | 9.7 |
| Coke | 9.8 |
| Methane | 0.5 |
| Ethylene | 2.3 |
| Ethane | 0.2 |
| Propylene | 1.9 |
| Propane | 0.2 |
| Butadiene | 0.1 |
| n-Butenes | 0.4 |
| Isobutene | 0.2 |
| n-Butane | 0.04 |
| Isobutane | 0.1 |
| $C_5$'s | 0.1 |
| Benzene | 4.9 |
| Toluene | 3.4 |
| Xylenes | 4.7 |
| Ethylbenzene | 10.9 |
| Ethyltoluene | 0.2 |
| Styrene | 4.5 |
| Alpha-methylstyrene | 0.8 |
| 2,5-Dimethylstyrene | 0.2 |
| 1-Propenylbenzene | 0.2 |
| 2-Propenylbenzene | 0.8 |
| p-Ethynyltoluene | 2.5 |
| Methylindene | 1.0 |
| Naphthalene | 9.4 |
| Methylnaphthalenes | 7.6 |
| Dimethylnaphthalenes | 1.4 |
| Ethylnaphthalene | 0.5 |
| Vinylnaphthalene | 0.8 |
| Fluorene | 0.8 |
| Methylfluorene | 0.3 |
| Phenanthrene | 0.3 |
| Methylphenanthrene | 0.7 |
| Methylanthracene | 0.2 |
| Benzofluorenes | 1.0 |

TABLE III-continued

| Product | Normalized Yield (Wt. %) |
|---|---|
| 9-Phenylfluorene | 0.2 |
| Chrysene | 0.3 |
| Triphenylene | 0.3 |
| 0-Cyclopropen-1-yltoluene | 1.0 |
| Methylbiphenyl | 0.4 |
| 0-Toluylstyrene | 0.4 |
| 1,2-Diphenylethylene | 0.2 |
| 1,2-Diphenylacetylene | 1.3 |
| 1,3-Diphenylpropane | 0.6 |
| Terphenyl | 0.5 |
| Phenylidenes | 0.7 |
| Phenylnaphthalenes | 0.9 |

The spent catalyst, which was grey in color owing to the coke deposited thereon during the cracking step, was regenerated by heating in the presence of air to yield regenerated catalyst having the same color as the original zeolite catalyst. The filler was recovered in the form of colorless glass fibers and particulate calcium carbonate.

EXAMPLE 4

To demonstrate that filled thermoplastic as well as thermoset polymers may be successfully recovered using the process of this invention, Example 1 was repeated using 0.4 g "Dylark" 378 P20 (a glass fiber-filled styrene/maleic anhydride copolymer resin available from ARCO Chemical Company). The mass balance observed was 96%, while the oxygen balance was 100%. The products obtained are shown in Table IV.

TABLE IV

| Product | Normalized Yield (Wt. %) |
|---|---|
| Methane | 1.1 |
| Ethylene | 2.3 |
| Ethane | 0.2 |
| Propylene | 1.6 |
| Propane | 0.5 |
| $C_4$'s | 0.6 |
| Carbon Dioxide | 7.3 |
| Benzene | 22.1 |
| Toluene | 11.2 |
| Xylenes + Ethylbenzene + Styrene | 9.4 |
| Heavier Liquids | 35.6 |
| Water | 1.3 |
| Coke on Catalyst | 4.9 |
| Residual Char | 2.0 |

EXAMPLES 5-6

These examples employed mixed post-consumer thermoplastics as feed (polyethylene, polypropylene, polystyrene, polyethylene terephthalate). The fluid bed conditions and catalyst of Example 3 were used. Table V indicates the products obtained.

TABLE V

| Example No. | 5 | 6 |
|---|---|---|
| Temperature | 551° C. | 553° C. |
| Mass Balance, % | 113 | 87 |
| Feed, g | 0.2 | 0.4 |
| Product | Normalized Yield (Wt. %) | |
| Methane | 0.3 | 0.3 |
| Ethylene | 2.8 | 2.5 |
| Ethane | 0.2 | 0.2 |
| Propylene | 3.5 | 3.2 |
| Propane | 0.7 | 0.9 |
| $C_4$'s | 2.2 | 2.6 |
| $C_5$'s | 0.4 | 0.6 |
| Carbon Dioxide | 18.1 | 15.7 |
| Benzene | 3.7 | 2.7 |
| Toluene | 7.6 | 3.5 |

TABLE V-continued

| | | |
|---|---|---|
| Xylenes + Ethylbenzene | 7.0 | 5.4 |
| Styrene | 1.7 | 1.7 |
| p-Methylstyrene | 1.8 | 2.4 |
| 3-Methylindene | 0.6 | 1.9 |
| Naphthalene | 11.4 | 7.2 |
| Methylnaphthalenes | 12.1 | 10.8 |
| Dimethylnaphthalenes | 2.9 | 2.9 |
| Biphenyl | 6.1 | 3.7 |
| Methylbiphenyls | 1.5 | 1.1 |
| Diphenylmethane | 0.8 | 0.3 |
| Fluorene | 1.2 | 0.6 |
| Anthracene + Phenanthrene | 0.9 | 0.6 |
| Terphenyl | 0.4 | 1.1 |
| Terephthalates | — | 4.6 |
| Other Liquids | 3.7 | 9.4 |
| Coke | 8.4 | 14.4 |

We claim:

1. A process for reclaiming a filled thermoset polymer comprising the steps of:
   (a) Contacting particles of the polymer and a zeolite-containing particulate catalyst in a fluidized bed reaction zone at a temperature effective to produce a coarse filler component, coke, a volatile organic component, and a spent catalyst component;
   (b) Withdrawing a first stream comprising the volatile organic component from the reaction zone;
   (c) Withdrawing a second stream comprising spent catalyst, coke, and the coarse filler component from the reaction zone;
   (d) Heating the second stream in a regeneration zone in the presence of oxygen at a temperature effective to convert the coke to carbon dioxide and water and to regenerate the catalyst; and
   (e) Separating the regenerated catalyst and coarse filler component.

2. The process of claim 1 wherein the process is performed in a continuous manner.

3. The process of claim 1 wherein the zeolite-containing particulate catalyst has an average particle diameter of from about 10 to 150 microns.

4. The process of claim 1 wherein the filled thermoset polymer is derived from an isocyanate-containing reactant.

5. The process of claim 4 wherein the volatile organic component is comprised of at least one organic amine.

6. The process of claim 1 wherein the filled thermoset polymer is selected from the group consisting of unsaturated polyester resins, polyurethanes, polyureas, polyurethane-modified polyisocyanurates, polyisocyanurates, phenol-formaldehyde resins, epoxy resins, and mixtures thereof.

7. The process of claim 1 wherein the zeolite component of the zeolite-containing particulate catalyst is selected from the group consisting of ZSM-4, ZSM-5, ZSM-11, ZSM-12, ZSM-22, ZSM-23, ZSM-34, ZSM-35, ZSM-38, ZSM-48, ZSM-50, erionite, offretite, mordenite, faujasite, zeolite L, zeolite beta, zeolite Y, zeolite X, and mixtures thereof.

8. The process of claim 1 wherein the zeolite component of the zeolite-containing particulate catalyst is an acidic zeolite.

9. The process of claim 1 wherein the zeolite component of the zeolite-containing particulate catalyst is a Group VA or boron-containing zeolite.

10. The process of claim 1 wherein particles of a thermoplastic polymer are additionally present in step (a).

11. The process of claim 1 wherein the first stream additionally comprises a fine filler component.

12. The process of claim 11 comprising the additional step of separating the fine filler component and the volatile organic component.

13. The process of claim 12 wherein the separated fine filler component is subjected to step (d) together with the second stream.

14. The process of claim 1 wherein the regenerated catalyst is introduced to the reaction zone.

15. The process of claim 1 wherein a carrier gas is additionally present in step (a).

16. The process of claim 1 wherein the temperature in step (a) is from about 450° C. to 750° C.

17. A process for reclaiming a filled thermoset polymer derived from an isocyanate-containing reactant comprising the steps of:
   (a) Contacting particles of the polymer and a zeolite-containing particulate catalyst in a dense fluidized bed reaction zone at a temperature of from about 450° C. to 750° C. to produce a coarse filler component, coke, a volatile organic component comprised of at least one organic amine, and a spent catalyst component;
   (b) Withdrawing a first stream comprising the volatile organic component from the reaction zone;
   (c) Withdrawing a second stream comprising spent catalyst, coke, and the coarse filler component from the reaction zone;
   (d) Heating the second stream in a regeneration zone in the presence of oxygen at a temperature of from about 450° C. to 850° C. so as to convert the coke to carbon dioxide and to regenerate the catalyst;
   (e) Separating the regenerated catalyst and coarse filler component; and
   (f) Introducing the regenerated catalyst to the reaction zone.

18. The process of claim 17 wherein the process is performed in a continuous manner.

19. The process of claim 17 wherein the zeolite-containing particulate catalyst has an average particle diameter of from about 10 to 150 microns.

20. The process of claim 17 wherein the coarse filler component is comprised of glass fiber.

21. The process of claim 17 wherein the filled thermoset resin is selected from the group consisting of polyurethanes, polyureas, polyisocyanurates, polyurethane-modified polyisocyanurates, and mixtures thereof.

22. The process of claim 17 wherein the zeolite component of the zeolite-containing particulate catalyst is selected from the group consisting of phosphorus-containing ZSM-5, ZSM-11, ZSM-21, and ZSM-35 zeolites.

23. The process of claim 17 wherein particles of a thermoplastic polymer are additionally present in step (a).

24. The process of claim 17 wherein the first stream additionally comprises a fine filler component.

25. The process of claim 24 comprising the additional step of separating the fine filler component and the volatile organic component.

26. The process of claim 25 wherein the fine filler component is subjected to step (d), together with the second stream.

27. The process of claim 17 wherein a carrier gas is introduced into the reaction zone in step (a) so as to facilitate removal of the volatile organic component from the reaction zone.

28. The process of claim 27 wherein the carrier gas is steam.

29. A process for converting a thermoset polymer derived from an isocyanate-containing reactant to a volatile organic component comprised of at least one organic amine, said process comprising contacting particles of the thermoset polymer and a zeolite-containing particulate catalyst at a temperature of from about 450° C. to 750° C.

30. The process of claim 29 wherein the thermoset polymer is selected from the group consisting of polyurethanes, polyureas, polyisocyanurates, polyurethane-modified polyisocyanurates, and mixtures thereof.

31. The process of claim 29 wherein said contacting step is carried out in a dense fluidized bed reaction zone.

32. The process of claim 29 wherein the zeolite component of the zeolite-containing particulate catalyst is ZSM-5.

33. The process of claim 29 wherein the zeolite component of the zeolite-containing particulate catalyst is a phosphorus-or boron-containing zeolite.

* * * * *